(12) United States Patent
Zhu et al.

(10) Patent No.: US 12,491,334 B1
(45) Date of Patent: Dec. 9, 2025

(54) POSTOPERATIVE ANTI-INFECTION PROTECTIVE DEVICE FOR UROLOGICAL SURGERY

(71) Applicant: GUANGZHOU INSTITUTE OF CANCER RESEARCH, THE AFFILIATED CANCER HOSPITAL, GUANGZHOU MEDICAL UNIVERSITY, Guangdong (CN)

(72) Inventors: Yingwen Zhu, Guangdong (CN); Ling Li, Guangdong (CN); Jiajun Li, Guangdong (CN); Yanfei Chen, Guangdong (CN); Xuejin Zhu, Guangdong (CN); Sian Chen, Guangdong (CN); Zhimei Wen, Guangdong (CN)

(73) Assignee: GUANGZHOU INSTITUTE OF CANCER RESEARCH, THE AFFLIATED CANCER HOSPITAL GUANGZHOU MEDICAL UNIVERSITY, Guangzhou (CN)

( * ) Notice: Subject to any disclaimer, the term of this patent is extended or adjusted under 35 U.S.C. 154(b) by 0 days.

(21) Appl. No.: 19/231,350

(22) Filed: Jun. 6, 2025

Related U.S. Application Data

(63) Continuation of application No. PCT/CN2025/094169, filed on May 12, 2025.

(51) Int. Cl.
*A61M 25/00* (2006.01)

(52) U.S. Cl.
CPC . *A61M 25/0017* (2013.01); *A61M 2210/1089* (2013.01)

(58) Field of Classification Search
CPC ...... A61M 25/0017; A61M 2210/1089; A61M 2210/1085; A61M 25/002;
(Continued)

(56) References Cited

U.S. PATENT DOCUMENTS

| 4,813,943 | A | * | 3/1989 | Smith | A61F 5/4408 |
| | | | | | 604/350 |
| 2002/0007160 | A1 | * | 1/2002 | Miskie | A61F 5/453 |
| | | | | | 604/350 |

(Continued)

FOREIGN PATENT DOCUMENTS

CN 107049586 A * 8/2017 ........... A61F 5/4408

*Primary Examiner* — Adam Marcetich

(57) ABSTRACT

The present disclosure provides a postoperative anti-infection protective device for urological surgery, including a protection system, a fixing assembly, an anti-spattering assembly and a valve assembly. In the present disclosure, the protection system is connected to the fixing assembly in a detachable manner, the fixing assembly is connected to the human body, and the protection system can also play a protective effect when a human body moves, ensuring that the protective effect is not affected by the state of the human body. The anti-spattering assembly is mounted in the fixing assembly, which can disperse the urine discharged by the human body and reduce the sputtering of urine caused by impact. The main function of the valve assembly is to close the protection system after urine has been discharged to prevent the outside world from polluting an interior of the protection system.

8 Claims, 7 Drawing Sheets

(58) Field of Classification Search
CPC .. A61M 2202/0496; A61M 2210/1078; A61M 2210/1092; A61M 2210/1096; A61F 2/0009; A61F 5/44; A61F 5/4404; A61F 5/4408; A61F 2220/0008; A61F 5/451; F16K 3/03
See application file for complete search history.

(56) References Cited

U.S. PATENT DOCUMENTS

| | | | |
|---|---|---|---|
| 2002/0087131 A1* | 7/2002 | Wolff | A61B 5/20 604/327 |
| 2002/0193763 A1* | 12/2002 | Kulikov | A61F 5/453 604/350 |
| 2004/0176746 A1* | 9/2004 | Forral | A61F 5/453 604/544 |
| 2006/0255066 A1* | 11/2006 | Kannar | B65D 75/5866 222/287 |
| 2017/0119572 A1* | 5/2017 | Mullings | A61F 5/4408 |
| 2020/0352774 A1* | 11/2020 | Rabinowitz | A61F 5/453 |
| 2022/0165576 A1* | 5/2022 | Ren | F16K 3/10 |
| 2022/0183417 A1* | 6/2022 | Hajianpour | A41D 13/1153 |
| 2023/0181427 A1* | 6/2023 | Pineda | A61J 11/002 215/11.1 |
| 2024/0295677 A1* | 9/2024 | Viehbacher | F16K 31/5286 |
| 2025/0255588 A1* | 8/2025 | Malyon | A61F 5/451 |

\* cited by examiner

POSTOPERATIVE ANTI-INFECTION PROTECTIVE DEVICE FOR UROLOGICAL SURGERY

CROSS-REFERENCE TO RELATED APPLICATION

This application is a continuation of PCT/CN2025/094169, filed on May 12, 2025, the entire contents of which are incorporated herein by reference.

TECHNICAL FIELD

The present disclosure relates to the technical field of postoperative protection, and in particular to a postoperative anti-infection protective device for urological surgery.

BACKGROUND

Urology is a medical field that focuses on diseases of the urinary system and the male reproductive system. The organs involved include the kidneys, ureters, bladder and urethra, as well as the testicles, epididymis and prostate in males. Doctors in the field diagnose and treat various urinary diseases including kidney stones, cystitis, prostate hyperplasia, and kidney tumors. In diagnostic terms, urologists typically use imaging tests (e.g. ultrasound, computerized tomography (CT), and magnetic resonance imaging (MRI)), urinalysis, and endoscopy to determine the nature and extent of the disease. Treatment methods are diverse, and surgical methods cover open surgery and minimally invasive surgery including laparoscopic surgery and transurethral surgery.

After urological surgery, postoperative infection is a significant problem affecting patient recovery. Existing anti-infection techniques usually include postoperative antibiotics, sterile dressings, and closed drainage systems. However, these methods often do not completely avoid infection, and some methods may lead to other complications. Therefore, it is particularly important to develop new anti-infection protection devices. Postoperative anti-infection protective device for urological surgery is designed to form a physical barrier to prevent the invasion of external microorganisms, while allowing the breathability of the wound and promoting healing. The use of this device can significantly reduce the incidence of postoperative infection, thereby shortening hospital stay, reducing the cost of treatment for patients, and improving postoperative quality of life. In addition, patients using the device experience a corresponding reduction in psychological burden during postoperative recovery, as these patients are better guaranteed in terms of infection risk control. In some operations in urology, sensitive parts of the patient are involved. This complicates postoperative care. Postoperative care requires attention not only to recovery of sensitive areas, but also to avoid further damage to wounds. Moderate amounts of exercise help accelerate recovery, but while exercising, patients can easily inadvertently touch the wounds, potentially causing secondary injuries that can further limit the patient's mobility.

In the process of postoperative nursing, it is crucial to evaluate the recovery degree of patients. In which, urine test results are one of the key indicators. When urine test is required on a patient, urine samples are usually collected temporarily. However, urine may be inadvertently spilled during defecation, and wounds may come into contact with contaminated urine, increasing the risk of infection, especially in private hygiene. Therefore, in postoperative care, special attention needs to be paid to the patient's urination and defecation behavior to ensure cleanliness and safety of sensitive areas and minimize the chance of infection. This requires nurses to have meticulous observation and ingenious nursing methods, thereby providing more thoughtful care for patients and ensuring the smooth recovery process of patients.

Although existing postoperative anti-infection protective device for urological surgery can overcome certain anti-infection problems in terms of drugs, the solutions to the anti-infection problems of the external parts of the postoperative urinary system that are in direct contact with the air are not mature enough.

SUMMARY

The present disclosure provides a postoperative anti-infection protective device for urological surgery to overcome the deficiencies that although some anti-infection problems can be overcome in drugs in the related art, and the solutions to anti-infection problems of external parts of a postoperative urinary system that are in direct contact with air are not mature enough. In one aspect, the present disclosure provides a postoperative anti-infection protective device for urological surgery, including a protection system, a fixing assembly, an anti-spattering assembly and a valve assembly, the fixing assembly is mounted on a human body, the protection system is connected to the fixing assembly in a detachable manner, the anti-spattering assembly is mounted in the fixing assembly, and the valve assembly is arranged in the protection system and is fixedly connected to the protection system.

According to the postoperative anti-infection protective device for urological surgery provided by the present disclosure, the fixing assembly includes a large binding strap, two connecting straps, two leg binding straps, two telescopic straps and a lock catch I, ends of the two connecting straps are fixedly connected to the large binding strap, and the other ends of the two connecting straps are connected to the protection system in a detachable manner; the two leg binding straps are symmetrically arranged on two sides of the protection system and connected to the protection system in a detachable manner; and the two telescopic straps are movably connected to two ends of the large binding strap, and the lock catch I is used for locking the two telescopic straps.

According to the postoperative anti-infection protective device for urological surgery provided by the present disclosure, the lock catch I includes a lock shell, a locking gear I and a knob I, the two telescopic straps are slidably connected to the lock shell, the locking gear I is rotatably connected to the lock shell, and the knob I is fixedly connected to the locking gear I.

According to the postoperative anti-infection protective device for urological surgery provided by the present disclosure, the protection system includes a protection chamber, a collection chamber, a urethral catheter and an occlusion balloon, one end of the collection chamber is fixedly connected to the protection chamber, the other end of the collection chamber is fixedly connected to one end of the urethral catheter, and the occlusion balloon is fixedly mounted on the other end of the urethral catheter.

According to the postoperative anti-infection protective device for urological surgery provided by the present disclosure, the anti-spattering assembly includes an anti-spattering plate, a knob II, two lock catches II, a locking gear II and two racks I, the anti-spattering plate is slidably connected to the protection chamber, the two lock catches II are slidably connected to the anti-spattering plate, and the two racks I are fixedly connected to the two lock catches II; and the locking gear II is meshed with the two racks I, the locking gear II is rotatably connected to the anti-spattering plate, and the knob II is fixedly connected to the locking gear II.

According to the postoperative anti-infection protective device for urological surgery provided by the present disclosure, the anti-spattering plate is disposed with a plurality of anti-spattering holes, and the plurality of anti-spattering holes are used for dispersing urine and preventing urine from spattering.

According to the postoperative anti-infection protective device for urological surgery provided by the present disclosure, the valve assembly includes a fixing disk, a moving disk, a plurality of occlusion blocks, a plurality of limiting blocks I and a plurality of limiting blocks II, the fixing disk is fixedly connected to the occlusion balloon, the plurality of limiting blocks I are fixedly connected to the plurality of occlusion blocks, and the plurality of limiting blocks II are fixedly connected to the plurality of occlusion blocks; and the limiting blocks I and the limiting blocks II are located on two opposite sides of the occlusion blocks, the plurality of limiting blocks I are slidably connected to the fixing disk, and the plurality of limiting blocks II are slidably connected to the moving disk.

According to the postoperative anti-infection protective device for urological surgery provided by the present disclosure, a push rod assembly is further included and used for rotating the moving disk, the push rod assembly includes a push rod and a limiting rod, the push rod is fixedly connected to the moving disk, the limiting rod is fixedly connected to the push rod, and the limiting rod is slidably connected to the occlusion balloon.

According to the postoperative anti-infection protective device for urological surgery provided by the present disclosure, the cross-sectional shape of the occlusion blocks is "fan-shaped".

According to the postoperative anti-infection protective device for urological surgery provided by the present disclosure, arc-shaped grooves are disposed on two sides of the protection chamber for limiting positions of the protection chamber on inner sides of thighs.

In the postoperative anti-infection protective device for urological surgery provided by the present disclosure, the protection system is connected to the fixing assembly in a detachable manner. When the protection system is protected, the fixing assembly is connected to the human body, and the protection system can also play a protective effect when the human body moves, ensuring that the protective effect is not affected by the state of the human body. The anti-sputtering assembly is mounted in the fixing assembly, which can disperse the urine discharged by the human body and reduce the sputtering of urine caused by impact.

In the postoperative anti-infection protective device for urological surgery provided by the present disclosure, the valve assembly is arranged in the protection system and fixedly connected to the protection system. The main function of the valve assembly is to close the protection system after urine has been discharged to prevent the outside world from polluting an interior of the protection system.

In the postoperative anti-infection protective device for urological surgery provided by the present disclosure, the arc-shaped grooves are disposed on two sides of the protection chamber. The arc-shaped grooves are closely connected to the contours of the inner sides of the thighs, which can effectively fit the structure of the legs, ensuring that the protection chamber is not easy to slide or shift during use. The protection chamber can remain stable under various sports conditions, and the user's sense of security and comfort is improved.

BRIEF DESCRIPTION OF THE DRAWINGS

In order to explain the present disclosure or the technical solutions in the related art more clearly, a brief description will be given below with reference to the accompanying drawings which are used in the description of the examples or the related art. Obviously, the drawings in the description below are some examples of the present disclosure, and other drawings can be obtained according to these drawings without creative work for those ordinary skilled in the art.

Figure 1:
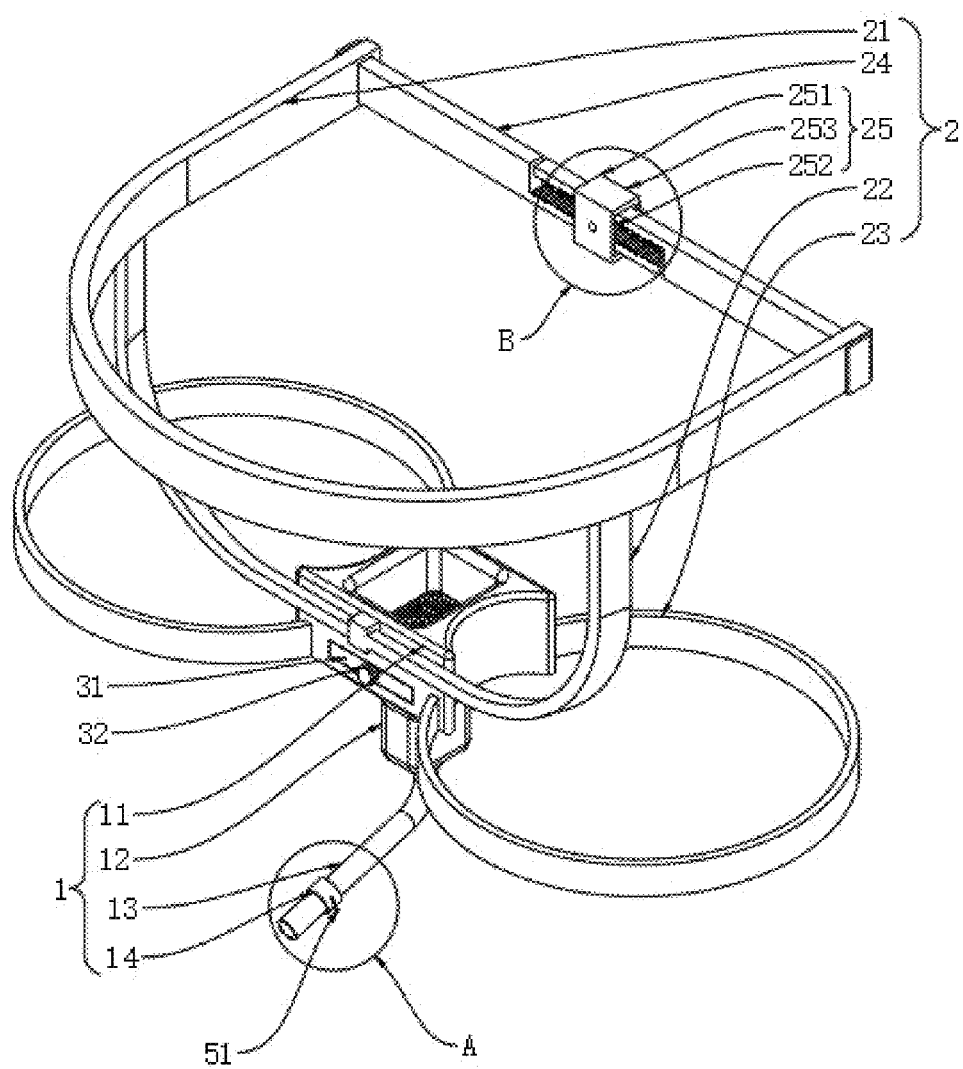
FIG. 1 is a schematic perspective structural view of a postoperative anti-infection protective device for urological surgery provided by an example of the present disclosure.

Reference numerals and denotations thereof: 1—protection system; 11—protection chamber; 12—collection chamber; 13—urethral catheter; 14—occlusion balloon; 2—fixing assembly; 21—large binding strap; 22—connecting strap; 23—leg binding strap; 24—telescopic strap; 25—lock catch I; 251—lock shell; 252—locking gear I; 253—knob I; 3—anti-spattering assembly; 31—anti-spattering plate; 311—anti-spattering hole; 32—knob II; 33—lock cache II; 34—locking gear II; 35—rack I; 4—valve assembly; 41—fixing disk; 411—limiting groove I; 421—limiting groove II; 42—moving disk; 43—occlusion block; 44—limiting block I; 45—limiting block II; 5—push rod assembly; 51—push rod; and 52—limiting rod.

DETAILED DESCRIPTION

In order to make the objects, technical solutions and advantages of the present disclosure more clear, technical solutions of the present disclosure will be described clearly and completely in the following with reference to the drawings of the present disclosure. Obviously, all the described examples are only some, rather than all examples of the present disclosure. Based on the examples in the present disclosure, all other examples obtained by those ordinary skilled in the art without creative efforts belong to the protection scope of the present disclosure.

Example I

A postoperative anti-infection protective device for urological surgery of the present disclosure will be described below with reference to FIGS. 1-9.

Figure 2:
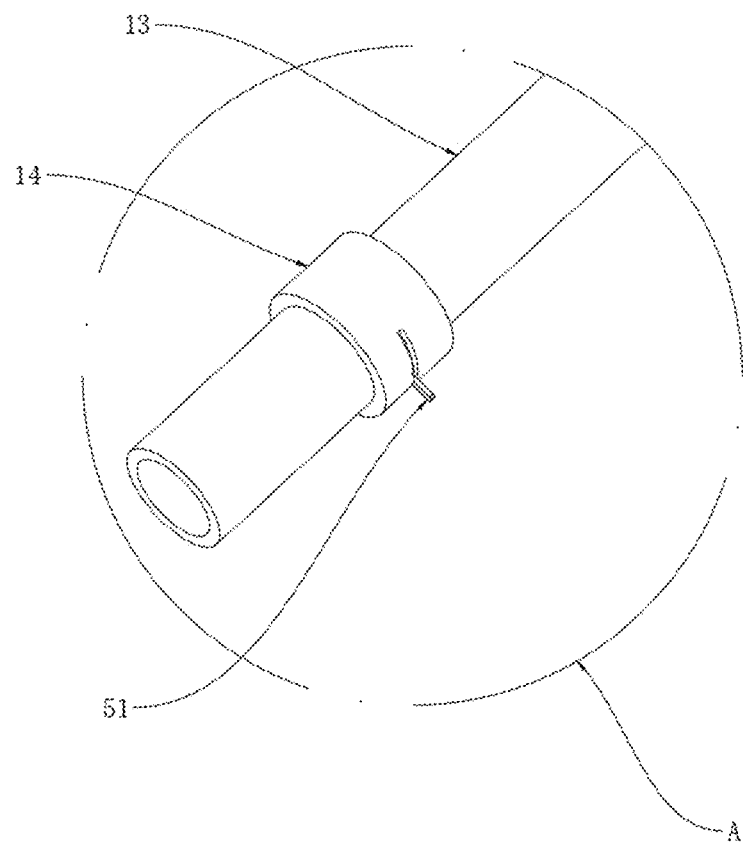
FIG. 2 is an enlarged view of a partial structure of region A in FIG. 1.
Figure 3:
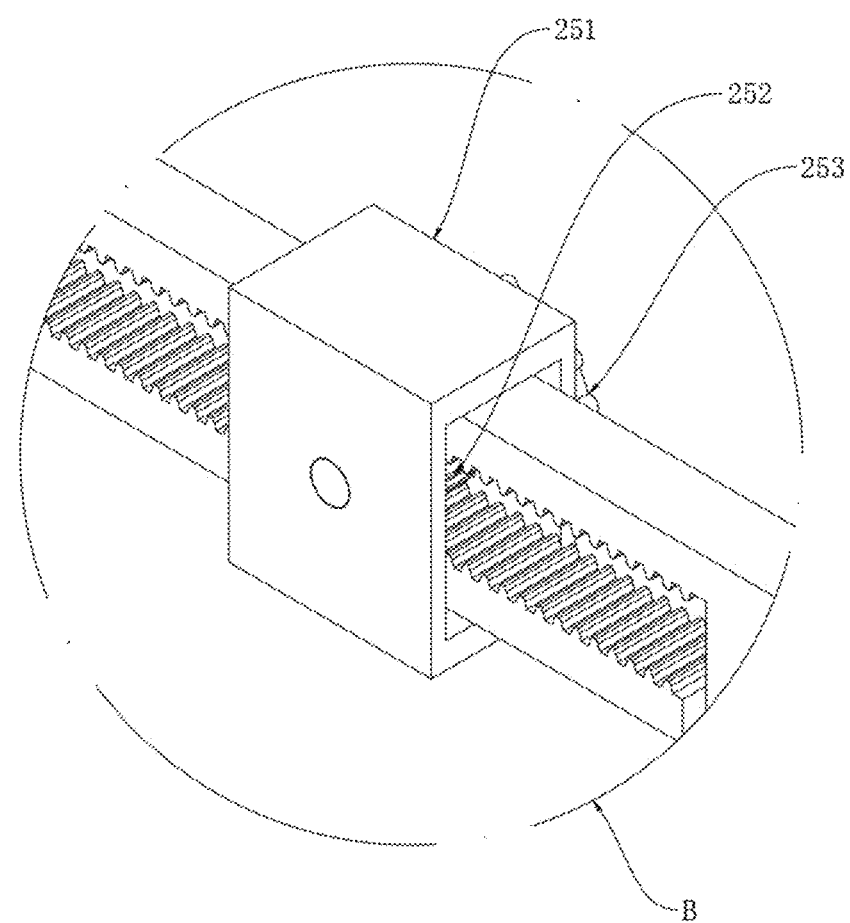
FIG. 3 is an enlarged view of a partial structure of region B in FIG. 2.
Figure 4:
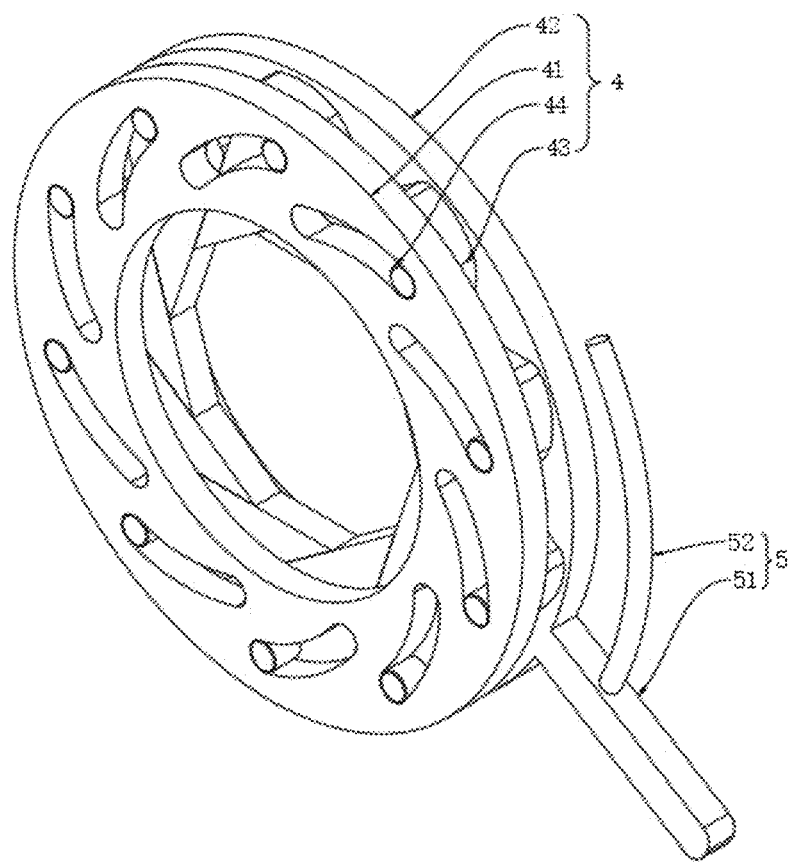
FIG. 4 is a schematic perspective structural view of a valve assembly and a push rod assembly in FIG. 1.
Figure 5:
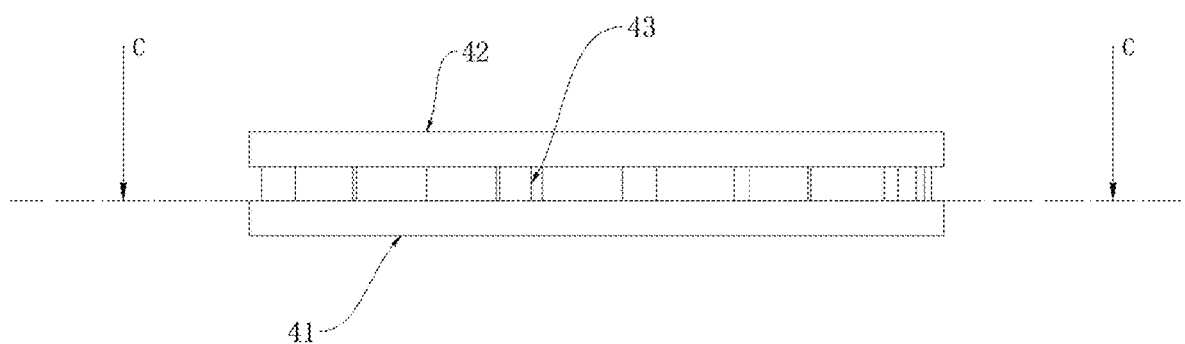
FIG. 5 is a top view of the valve assembly in FIG. 4.
Figure 6:
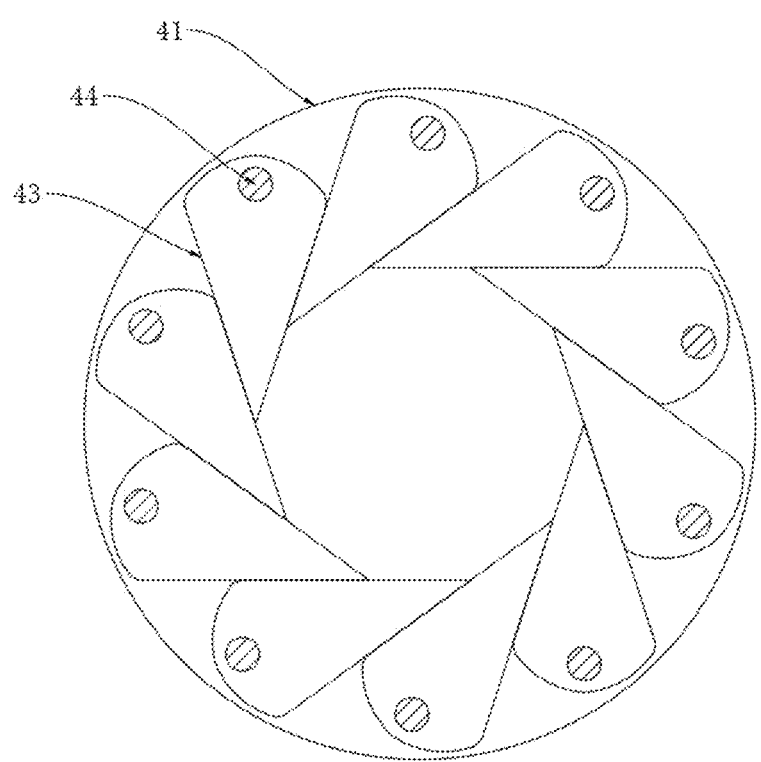
FIG. 6 is a schematic cross-sectional structural view along a C-C direction in FIG. 5.
Figure 7:
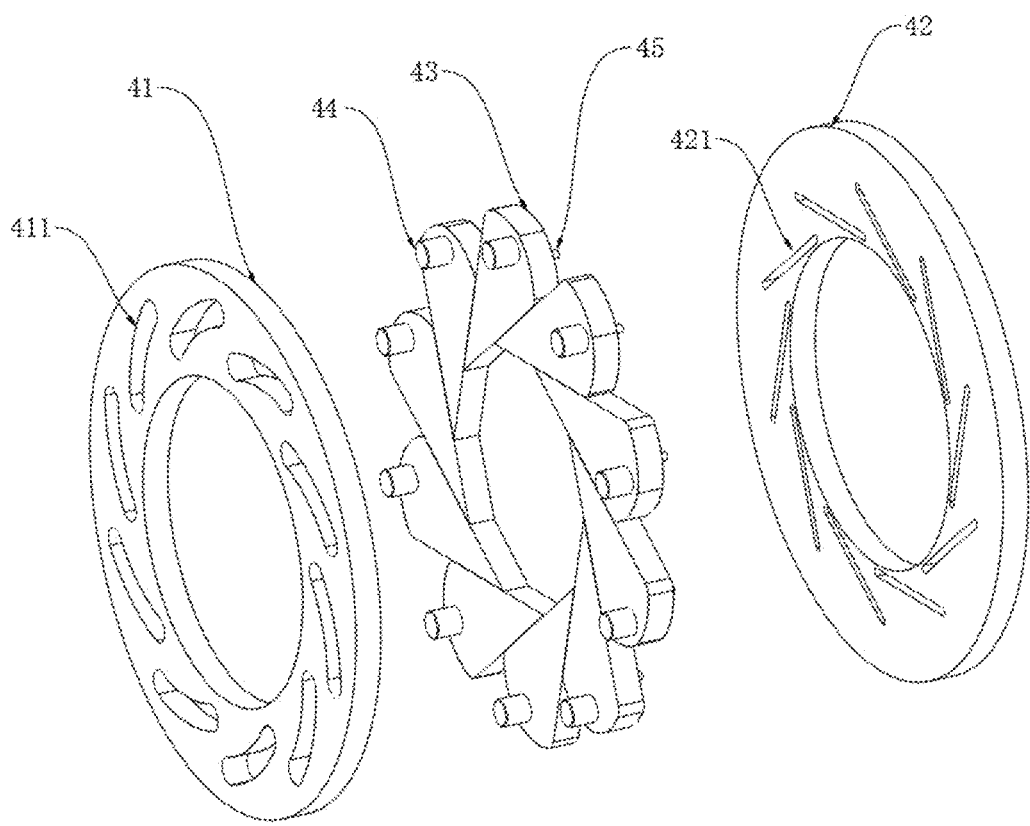
FIG. 7 is a schematic exploded structural schematic view of the valve assembly in FIG. 5.

As shown in FIGS. 1-3, an example of the present disclosure provides a postoperative anti-infection protective device for urological surgery, including a protection system 1, a fixing assembly 2, an anti-spattering assembly 3 and a valve assembly 4. The fixing assembly 2 is mounted on a human body, and the fixing assembly 2 can be adjusted according to the body type of different people to fit more different body types of people. The protection system 1 is connected to the fixing assembly 2; and when the protection system 1 is protected, the fixing assembly 2 is connected to the human body, and the protection system 1 can also play a protective effect when the human body moves, ensuring that the protective effect is not affected by the state of the human body. The anti-spattering assembly 3 is mounted in the fixing assembly 2, which can disperse the urine discharged by the human body and reduce the sputtering of urine caused by impact. The valve assembly 4 is arranged in the protection system 1 and is fixedly connected to the protection system 1, and the main function of the valve assembly 4 is to close the protection system 1 after urine has been discharged to prevent the outside world from polluting an interior of the protection system 1.

The fixing assembly 2 includes a large binding strap 21, two connecting straps 22, two leg binding straps 23, two telescopic straps 24 and a lock catch I 25. Under the combined action of the large binding strap 21 and the two leg binding straps 23, the entire protective device can be tightly fixed to the human body. The telescopic straps 24 allow the position of the protection system 1 to be adjusted as required, allowing the human body to play a protective effect against infection even when walking normally. Ends of the two connecting straps 22 are fixedly connected to the large binding strap 21, and the other ends of the two connecting straps 22 are connected to the protection system 1 in a detachable manner; and the main role of the two connecting straps 22 is to limit the position of the protection system 1, the connecting straps 22 can use adjustable connecting straps, and the protection system 1 can be adapted to different human bodies by adjusting the length of the connecting straps 22. The two leg binding straps 23 are symmetrically arranged on two sides of the protection system 1 and connected to the protection system 1 in a detachable manner; and after the position of the protection system 1 is determined, the two leg binding straps 23 are adjusted to bind the straps to the thighs to limit the position of the protection system 1. The two telescopic straps 24 are movably connected to two ends of the large binding strap 21, ends of the telescopic straps 24 is fixedly connected to racks, and the racks penetrate through the lock catch I 25; and by adjusting the lock catch I 25, the two telescopic straps 24 can move in opposite or relative directions, the lock catch I 25 is used for locking the two telescopic straps 24, and when the two telescopic straps 24 move to appropriate positions, the positions of the telescopic straps 24 can be fixed by stopping adjusting the lock catch I 25.

The lock catch I 25 includes a lock shell 251, a locking gear I 252 and a knob I 253; the material used for the lock shell 251 is usually aluminum alloy material, which has relatively high hardness and can also maintain excellent mechanical properties, ensuring the stability and durability of the lock catch I 25; and the two telescopic straps 24 are slidably connected to the lock shell 251 to limit the position of the two telescopic straps 24 relative to the locking gear I 252. The two telescopic straps 24 are engaged with the locking gear I 252, and by adjusting the rotation direction of the locking gear I 252, the two telescopic straps 24 can be loosened or tightened. The locking gear I 252 is rotatably connected to the lock shell 251, and the locking gear I 252 does not deviate when rotating. The knob I 253 is fixedly connected to the locking gear I 252. By rotating the knob I 253, the locking gear I 252 is rotated, thereby driving the two telescopic straps 24 to move in opposite or relative directions; the large binding strap 21 is more tightly bound to the human body, thereby preventing the large binding strap 21 from slipping off; and the large binding strap 21 can provide stable support and comfortable use experience in daily activities.

The protection system 1 includes a protection chamber 11, a collection chamber 12, a urethral catheter 13 and an occlusion balloon 14. The protection chamber 11 is usually made of polyurethane (PU) material, which has flexibility and wear resistance, and can provide a certain degree of comfort while protecting. PU is a highly flexible material that is widely used in the medical field, especially in the manufacture of hard protective gear. PU is highly flexible and elastic, and capable of effectively absorbing impact forces. This material has high surface hardness, wear-resistant, can withstand daily wear during wear, and prolong the life of protective gear. Some PU materials have good breathability, used with sterilization layer helps prevent infection while reducing wetness and discomfort when wearing, enhancing comfort. PU after surface modification can increase hydrophilicity or decrease surface energy, and reduce irritation and allergic reaction when PU comes into contact with skin. Adding antimicrobial agents to PU materials can prevent bacterial growth, reduce the risk of infection, and improve the safety of materials in contact with skin. One end of the collection chamber 12 is fixedly connected to the protection chamber 11. The collection chamber 12 is mostly made of polycarbonate material, which has high toughness and transparency while also being able to withstand impact. Polycarbonate is transparent with high light transmittance, similar to glass. It is convenient to observe the internal state through the good transparency of polycarbonate. But polycarbonate is light in weight and less likely to break than glass. The polycarbonate can keep its physical properties at a high temperature, and the general working temperature range is between −40° C. to 120° C. Therefore, polycarbonate can perfectly adapt to the storage and discharge of urine. Polycarbonate can be processed and molded through injection molding, extrusion, thermoforming and other ways to adapt to different needs. The other end of the collection chamber 12 is fixedly connected to one end of the urethral catheter 13. The urethral catheter 13 is usually made of soft materials, including PU material, which has high tear resistance and tensile strength, and can meet long-term use. The occlusion balloon 14 is fixedly mounted on the other end of the urethral catheter 13. The occlusion balloon 14 is mainly used for fixing the valve assembly 4 and the push rod assembly 5, and the valve assembly 4 and the push rod assembly 5 can only work within a range limited by the occlusion balloon 14.

Arc-shaped grooves are disposed on two sides of the protection chamber 11 for limiting positions of the protection chamber 11 on inner sides of thighs. The arc-shaped grooves disposed on the two sides of the protection chamber 11 not only provide necessary space limitations, but also consider the design of a comprehensive embodiment of ergonomics and freedom of movement. The shape of the arc-shaped grooves is closely connected to the contour of the inner sides of the thighs, which can effectively fit the structure of the legs, ensuring that the protection chamber 11 is not easy to slide or shift during use. The protection chamber 11 can remain stable under various sports conditions, and the user's sense of security and comfort is improved. The depth and width of the grooves are accurately calculated to suit the needs of users with different sizes. This structural design helps distribute the pressure during sports or activities, avoiding excessive localized pressure on muscles and joints, and reducing the risk of injury.

As shown in FIGS. 4-7. The valve assembly 4 includes a fixing disk 41, a moving disk 42, a plurality of occlusion blocks 43, a plurality of limiting blocks I 44 and a plurality of limiting blocks II 45, the fixing disk 41 is fixedly connected to the occlusion balloon 14, the fixing disk 41 is disposed with a plurality of limiting grooves I 411 for limiting the moving direction of the limiting blocks I 44, and the limiting blocks I 44 can move within a set range. The cross-sectional shape of the occlusion blocks 43 is "fan-shaped", and when sealing, the plurality of occlusion blocks 43 can be completely closed in pairs, and the structural feature is the shutter structure of the camera. The plurality of limiting blocks I 44 are fixedly connected to the plurality of occlusion blocks 43; and when the limiting blocks I 44 slide along the limiting grooves I 411, the occlusion blocks 43 are driven to move, the plurality of occlusion blocks 43 abut against each other to limit the moving state of all occlusion blocks 43, and the occlusion blocks 43 can always be perfectly closed and opened. The plurality of limiting blocks II 45 are fixedly connected to the plurality of occlusion blocks 43, and the limiting blocks I 44 and the limiting blocks II 45 are located on two opposite sides of the occlusion blocks 43; and the control flow between the three is: the limiting blocks II 45 control the operation of the occlusion blocks 43, and the limiting blocks I 44 limit the overall movement state of the occlusion blocks 43. The plurality of limiting blocks I 44 are slidably connected to the fixing disk 41, and the plurality of limiting blocks II 45 are slidably connected to the moving disk 42. The moving disk 42 is disposed with limiting grooves II 421, and the limiting blocks II 45 are arranged in the limiting grooves II 421. By rotating the moving disk 42, the limiting blocks II 45 can be moved along, and finally the plurality of occlusion blocks 43 are polymerized inward, thereby achieving the objective of occluding the urethral catheter 13. Similarly, by controlling the opening and closing of the valve assembly 4, the flow and flow rate of urine can be controlled to adapt to the needs of different patients.

The postoperative anti-infection protective device for urological surgery also includes the push rod assembly 5 for rotating the moving disk 42. The push rod assembly 5 includes a push rod 51 and a limiting rod 52, the push rod 51 is fixedly connected to the moving disk 42, the limiting rod 52 is fixedly connected to the push rod 51, and the limiting rod 52 is slidably connected to the occlusion balloon 14. By pushing the push rod 51, the moving disk 42 can rotate in its limited space. The limiting rod 52 can keep the push rod 51 rotating at the same rotation center as the moving disk 42 to prevent the push rod 51 from shaking or loosening and affecting the sealing effect.

Figure 8:
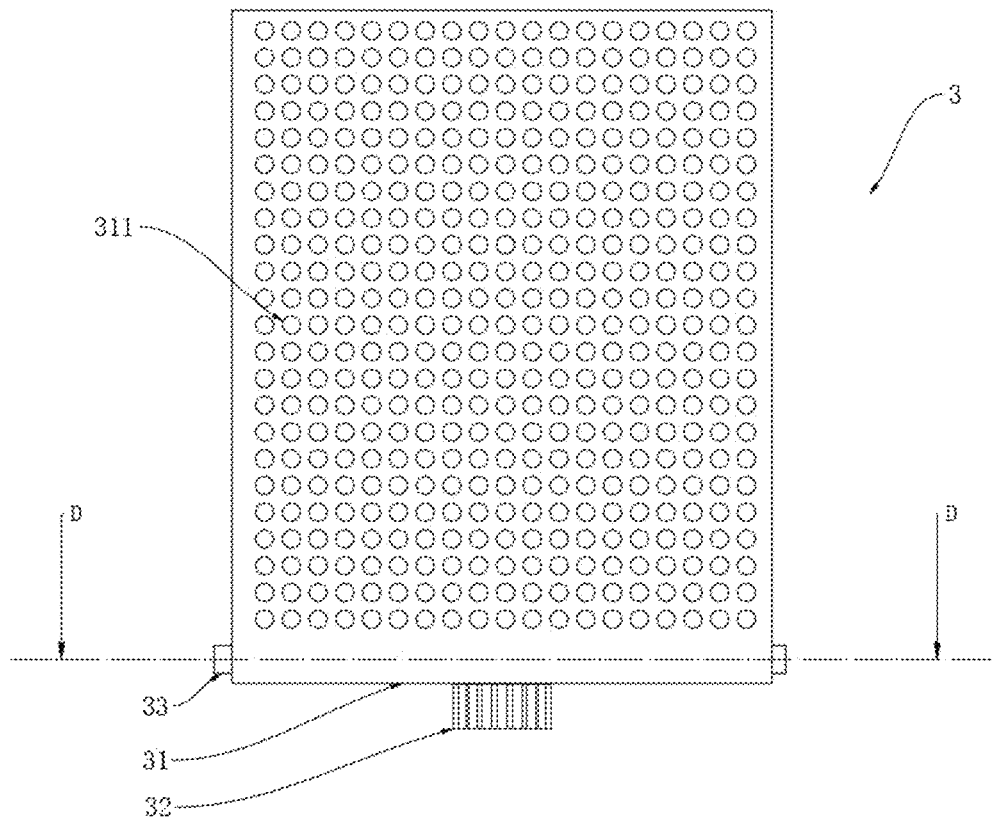
FIG. 8 is a top view of an anti-spattering assembly in FIG. 1.
Figure 9:
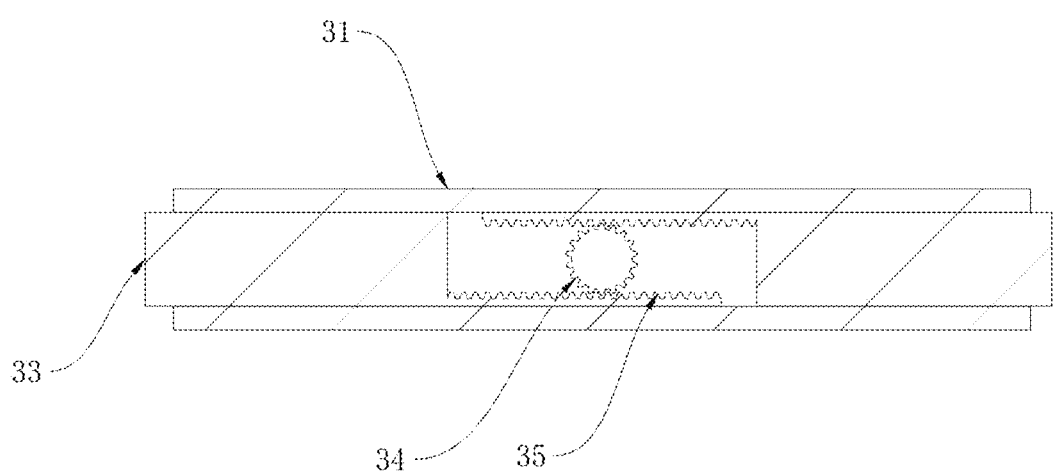
FIG. 9 is a schematic cross-sectional structural view along a D-D direction in FIG. 8.

As shown in FIGS. 8-9, the anti-spattering assembly 3 includes an anti-spattering plate 31, a knob II 32, two lock catches II 33, a locking gear II 34 and two racks I 35, and the anti-spattering assembly 3 is mainly used for preventing urine spattering. The anti-spattering plate 31 is slidably connected to the protection chamber 11, and the anti-spattering plate 31 can be replaced more conveniently. The two lock catches II 33 are slidably connected to the anti-spattering plate 31. By adjusting positions of the two lock catches II 33 to interact with the protection chamber 11, an objective of locking the anti-spattering plate 31 is achieved. The two racks I 35 are fixedly connected to the two lock catches II 33, the locking gear II 34 meshes with the two racks I 35, the locking gear II 34 is rotatably connected to the anti-spattering plate 31, and the knob II 32 is fixedly connected to the locking gear II 34. By rotating the knob II 32, the locking gear II 34 is driven to rotate for further driving; the two racks I 35 move in opposite or relative directions, the two racks I 35 intersect or disconnect with the protection chamber 11, thereby achieving an objective of locking or opening the anti-spattering plate 31.

The anti-spattering plate 31 is disposed with a plurality of anti-spattering holes 311. The plurality of anti-spattering holes 311 are used for dispersing urine. The distribution of the plurality of anti-spattering holes 311 can effectively extend the spread range of urine, urine is no longer concentrated on one point when contacting the anti-spattering plate 31, but is evenly dispersed to prevent urine from spattering.

In summary, the following describes the working principles of the postoperative anti-infection protective device for urological surgery of the present disclosure.

As shown in FIGS. 1-9, when wearing, the protection chamber 11 of the protection system 1 covers the lower body of the human body, the two telescopic straps 24 are inserted into the two ends of the large binding strap 21, and inserted into the lock shell 251 of the lock catch I 25. The knob I 253 is rotated to move the two telescopic straps 24 in opposite directions, thereby achieving an objective of tightening the large binding strap 21. The leg binding straps 23 are fixed to roots of the thighs to limit the position of the protection system 1, the protection system 1 will not deviate relative to the human body due to movement during use, and at the same time, the protection chamber 11 can tightly fit the lower body to achieve the effect of increasing sealing. An end of the urethral catheter 13 away from the collection chamber 12 is connected to an external liquid collecting device or performs urination directly. During urination, the push rod 51 is pushed to drive the moving disk 42 to rotate, the plurality of occlusion blocks 43 can move within a limited range and finally move away from a center of the valve assembly 4, and the valve assembly 4 is opened to achieve an objective of opening the urethral catheter 13. During urination, since the anti-spattering plate 31 is disposed with the plurality of anti-spattering holes 311, the distribution of the plurality of anti-spattering holes 311 can effectively extend the spread range of urine, urine is no longer concentrated on one point when contacting the anti-spattering plate 31, but is evenly dispersed to prevent urine from spattering. At the end of urination, it is only necessary to push the push rod 51 in the opposite direction to drive the moving disk 42 to rotate in the opposite direction, the plurality of occlusion blocks 43 can move within the limited range and finally converge in the center of the valve assembly, and the valve assembly 4 is closed to achieve an objective of occluding the urethral catheter 13.

The device examples described above are merely illustrative, in which the units described as separate components may or may not be physically separated, and the components displayed as units may or may not be physical units, that is, they may be located in one place or distributed over multiple network units. Some or all of the modules may be selected according to actual needs to achieve the objective of the solution of this example. It can be understood and implemented by those skilled in the art without creative effort.

From the above description of the embodiments, those skilled in the art will clearly understand that each embodiment can be implemented by software and a necessary general hardware platform, and of course, it can also be implemented by hardware. Based on such understanding, the above technical solution essentially or the part that contributes to the related art can be embodied in the form of a software product, and the computer software product can be stored in a computer-readable storage medium, such as read-only memory (ROM)/random-access memory (RAM), magnetic disk, optical disk, etc. including several instructions for causing a computer device (which can be a personal computer, server, or network device, etc.) to perform the methods described in various examples or certain parts of the examples.

Finally, it is to be noted that the above examples are only used to technical solutions of the present disclosure, and are not limited to the present disclosure. Although the present disclosure has been described in detail with reference to the foregoing examples, those skilled in the art will understand that the technical solutions disclosed in the above examples can still be modified, or some of the technical features thereof can be replaced by equivalents. However, these modifications and substitutions do not make the essence of the corresponding technical solutions depart from the spirit and scope of the technical solutions of various examples of the present disclosure.

The invention claimed is:

1. A postoperative anti-infection protective device for urological surgery, comprising:
   a protection system (1);
   a first assembly (2);
   an anti-spattering assembly (3); and
   a second assembly (4);
   wherein the first assembly (2) is configured to be mounted on a human body, the protection system (1) is connected to the first assembly (2) in a detachable manner, the anti-spattering assembly (3) is mounted in the first assembly (2), and the second assembly (4) is arranged in the protection system (1) and is fixedly connected to a drainage tube (13) of the protection system (1);
   wherein the protection system (1) further comprises a protection chamber (11), a collection chamber (12) and a cover sleeve (14), one end of the collection chamber (12) is fixedly connected to the protection chamber (11), the other end of the collection chamber (12) is fixedly connected to one end of the drainage tube (13), and the cover sleeve (14) is fixedly mounted on the other end of the drainage tube (13);
   wherein the anti-spattering assembly (3) comprises an anti-spattering plate (31), a second knob (32), two second lock catches (33), a second locking gear (34) and two racks (35), the anti-spattering plate (31) is slidably connected to the protection chamber (11), the two second lock catches (33) are slidably connected to the anti-spattering plate (31), and the two racks (35) are fixedly connected to the two second lock catches (33); and the second locking gear (34) is meshed with the two racks (35), the second locking gear (34) is rotatably connected to the anti-spattering plate (31), and the second knob (32) is fixedly connected to the second locking gear (34).

2. The postoperative anti-infection protective device for urological surgery according to claim 1, wherein the first assembly (2) comprises a large binding strap (21), two connecting straps (22), two leg binding straps (23), two telescopic straps (24) and a first lock catch (25); ends of the two connecting straps (22) are fixedly connected to the large binding strap (21), and the other ends of the two connecting straps (22) are connected to the protection system (1) in a detachable manner; the two leg binding straps (23) are symmetrically arranged on two sides of the protection system (1) and connected to the protection system (1) in a detachable manner; and the two telescopic straps (24) are movably connected to two ends of the large binding strap (21), and the first lock catch (25) is used for locking the two telescopic straps (24).

3. The postoperative anti-infection protective device for urological surgery according to claim 2, wherein the first lock catch (25) comprises a lock shell (251), a first locking gear (252) and a first knob (253), the two telescopic straps (24) are slidably connected to the lock shell (251), the first locking gear (252) is rotatably connected to the lock shell (251), and the first knob (253) is fixedly connected to the first locking gear (252).

4. The postoperative anti-infection protective device for urological surgery according to claim 1, wherein the anti-spattering plate (31) is disposed with a plurality of anti-spattering holes (311), and the plurality of anti-spattering holes (311) are used for dispersing urine and preventing urine from spattering.

5. The postoperative anti-infection protective device for urological surgery according to claim 1, wherein the second assembly (4) comprises a fixing disk (41), a moving disk (42), a plurality of occlusion blocks (43), a plurality of first limiting blocks (44) and a plurality of second limiting blocks (45), the fixing disk (41) is fixedly connected to the cover sleeve (14), the plurality of first limiting blocks (44) are fixedly connected to the plurality of occlusion blocks (43), and the plurality of second limiting blocks (45) are fixedly connected to the plurality of occlusion blocks (43); and the plurality of first limiting blocks (44) and the plurality of second limiting blocks (45) are located on two opposite sides of the occlusion blocks (43), the plurality of first limiting blocks (44) are slidably connected to the fixing disk (41), and the plurality of second limiting blocks (45) are slidably connected to the moving disk (42).

6. The postoperative anti-infection protective device for urological surgery according to claim 5, wherein a push rod assembly (5) is further comprised and used for rotating the moving disk (42), the push rod assembly (5) comprises a push rod (51) and a limiting rod (52), the push rod (51) is fixedly connected to the moving disk (42), the limiting rod (52) is fixedly connected to the push rod (51), and the limiting rod (52) is slidably connected to the cover sleeve (14).

7. The postoperative anti-infection protective device for urological surgery according to claim 5, wherein the occlusion blocks (43) have a fan-shaped cross section.

8. The postoperative anti-infection protective device for urological surgery according to claim 1, wherein arc-shaped grooves are disposed on two sides of the protection chamber (11) for limiting positions of the protection chamber (11) on inner sides of thighs.

* * * * *